Figure 1:
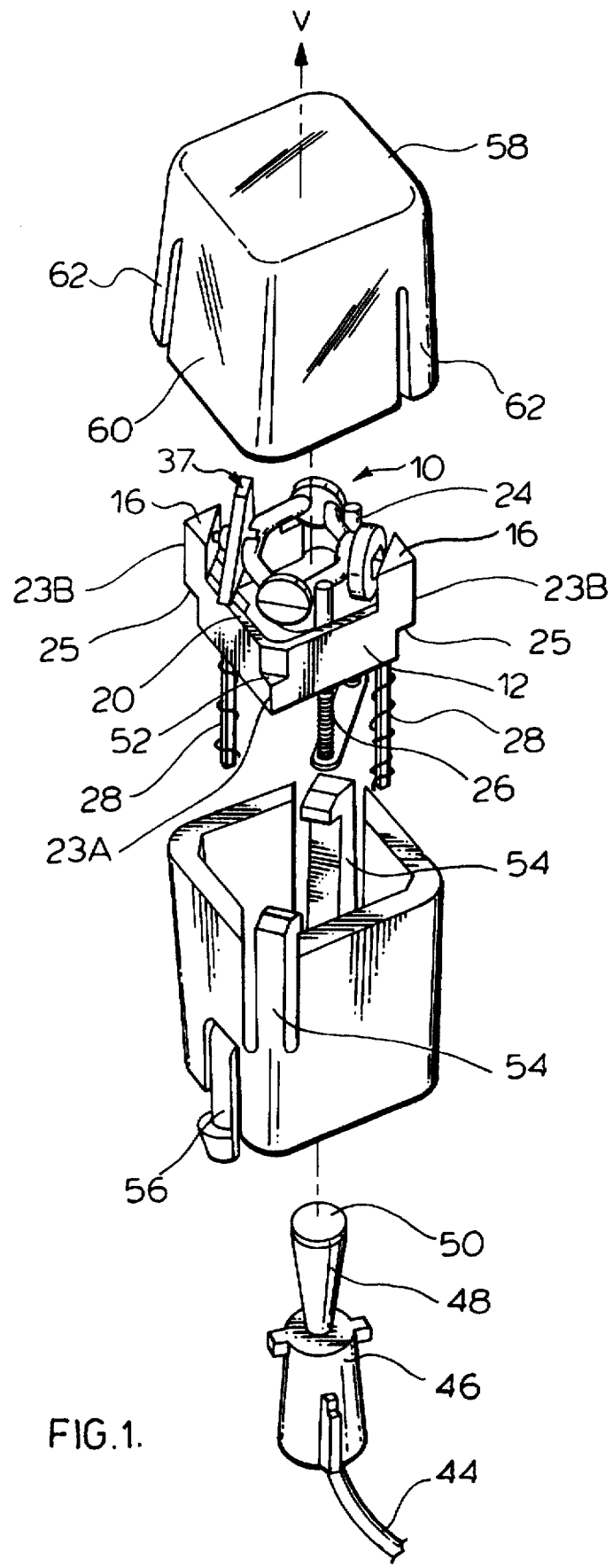

United States Patent [19]
Browne

[11] Patent Number: 5,793,349
[45] Date of Patent: Aug. 11, 1998

[54] ELECTROMAGNETIC SHUTTER AND COVER

[75] Inventor: John Browne, Oakville, Canada

[73] Assignee: Mark IV Industries Limited, Mississauga, Canada

[21] Appl. No.: 529,440

[22] Filed: Sep. 18, 1995

Related U.S. Application Data

[63] Continuation-in-part of Ser. No. 241,697, May 12, 1994, Pat. No. 5,666,134, which is a continuation of Ser. No. 855,063, Mar. 20, 1992, Pat. No. 5,337,077.

[51] Int. Cl.⁶ ..................................................... G09G 3/34
[52] U.S. Cl. ............................................ 345/109; 40/449
[58] Field of Search ........................... 345/108, 109, 345/110, 111; 340/815.42, 815.5, 815.54, 815.62, 815.64, 815.68, 815.9, 815.76; 40/449, 452, 447, 454, 446, 427, 430, 431

[56] References Cited

U.S. PATENT DOCUMENTS

| | | |
|---|---|---|
| 4,531,121 | 7/1985 | Brown ........................................ 345/108 |
| 4,833,806 | 5/1989 | Gars . |
| 4,958,150 | 9/1990 | Dabbaj .................................... 345/108 |
| 5,021,773 | 6/1991 | Browne . |
| 5,022,171 | 6/1991 | Norfolk et al. . |
| 5,055,832 | 10/1991 | Browne . |

FOREIGN PATENT DOCUMENTS

| | | |
|---|---|---|
| WO8502478 | 6/1985 | European Pat. Off. . |
| 1587795 | 3/1970 | France . |
| 2586129 | 2/1987 | France . |
| 3822105 | 1/1990 | Germany . |
| 4022649 | 10/1991 | Germany . |
| 2254161 | 9/1992 | United Kingdom . |

*Primary Examiner*—Xiao Wu

[57] ABSTRACT

A light shutter for selectively masking the light emitted from an optic fibre is combined with a transparent panel through which the emitted light will travel. The transparent panel may be lens shaped and used, for example, to reduce light divergence about a transverse axis or to expand light divergence about a transverse axis.

15 Claims, 4 Drawing Sheets

U.S. Patent    Aug. 11, 1998    Sheet 2 of 4    5,793,349

ELECTROMAGNETIC SHUTTER AND COVER

This application is a Continuation-in-Part of my application Ser. No. 08/241,697 filed May 12, 1994, now U.S. Pat. No. 5,665,134, which, in turn is a Continuation of application Ser. No. 07/855,063 filed Mar. 20, 1992, now U.S. Pat. No. 5,337,077 dated Aug. 9, 1994.

This invention relates to a shutter which in one (the ON) position allows light from a fibre optic (usually a fibre optic bundle) to pass in a viewing direction and in the other (the OFF) position blocks such light. The shutter is embodied in a rotor which rotates (usually about 90°) between ON and an OFF positions. The rotor comprises a pair of generally radially extending arms which diverge from a junction at each end to define, in ON position an aperture between the arms through which the light travels in said viewing direction. At least one of the junctions is provided with a panel which will, in OFF position, block the majority of the light. The rotor is mounted on a stator including drive means which also mounts an optic fibre or a bundle of fibres to define a viewing direction.

In accord with the invention there is provided a cover, including a transparent panel adapted to overlie the path of light emitted in said direction and side walls, for connection to said stator. The cover therefore forms a unit when assembled with stator and rotor and protects the stator and rotor against contamination, moisture or mechanical interference.

The fibre or fibre bundle usually including a lens will typically emit rays in a divergent cone. Hence the application assumes that such rays of a significant proportion, are divergent.

In one alternative the panel is parallel sided so that the rays from the optic fibre bundle are transmitted therethrough in the direction received.

By sectional beam pattern I mean the pattern of the beam on a plane perpendicular to the viewing direction.

In another alternative the transparent panel is formed into a lens (additional to any lens on the optic bundle) to divert the rays passing therethrough to form a desired viewing sectional beam pattern. A sectional beam pattern that is of particular interest occurs where the light from the fibre is to be visible over an area which is relatively wide relative to its depth. Thus a mall parking lot or a multilane throughway has potential viewers distributed over a relatively wide expanse. On the other hand the depth of distribution of viewers on the lot or the 'viewing range' of drivers on the highway represent relatively smaller vertical extents on a sectional beam pattern. With such a distribution between width and vertical dimension on such perpendicular plane, the cover is preferably formed into a cylindrical lens which will effectively spread the rays in the width direction without affecting the vertical components of the rays.

Alternatively the cover can be formed into a cylindrical lens with a horizontal axis to decrease ray divergence in the vertical direction to reduce the vertical components of rays where a large vertical divergence angle spread of rays is not needed.

Thus a cover with lens which is plano-concave (or concavo planar) about a vertical axis and also plano convex or convexo planar about a horizontal axis would narrow the beam in the vertical of the plane and widen the beam in the horizontal of the plane.

Broadly the cover lens may comprise any combination of cylindrical and spherical lenses to produce the desired sectional beam pattern.

In many applications the stator will be substantially square, when viewed in the viewing direction. In many of these applications a number of shutters, usually 3, are located side by side, as a single pixel to provide the light from 3 optic fibre bundles to act as a single pixel. When multiple rotors are assembled side by side in a single pixel, the appearance is thought to be enhanced if the square stator is oriented to have a vertical diagonal. In such a case for a parking lot or multilane highway the shutter will be mounted to have the axis of its cylindrical lens vertical (for increasing horizontal divergence of the rays) or may have the axis of a cylindrical lens for decreasing divergence of the rays in an horizontal orientation.

In a preferred form of the rotor and stator in accord with the invention the stator has outer walls with edges facing in the viewing direction and a stop element rotatable with the rotor utilizes the wall edges as stops to stop the rotor in the ON or in the OFF position.

The preferred form of rotor uses a pair of arms diverging from a junction adjacent each radially outward end to a central wider spacing. Where magnetic drive cores are used these frequently appear near one axial end of the rotor. The arm nearest the cores must in the preferred design have bends concave toward the cores to avoid mutual interference between them. The opposite arms may diverge in a relatively straight line from the junctions to their widest spacing. In ON position the arms define between them the aperture for the rays. Thus the ray sector may be slightly larger on the side where the straight arms occur and the housing may therefore be oriented to provide the extra light where most needed.

Figure 2:
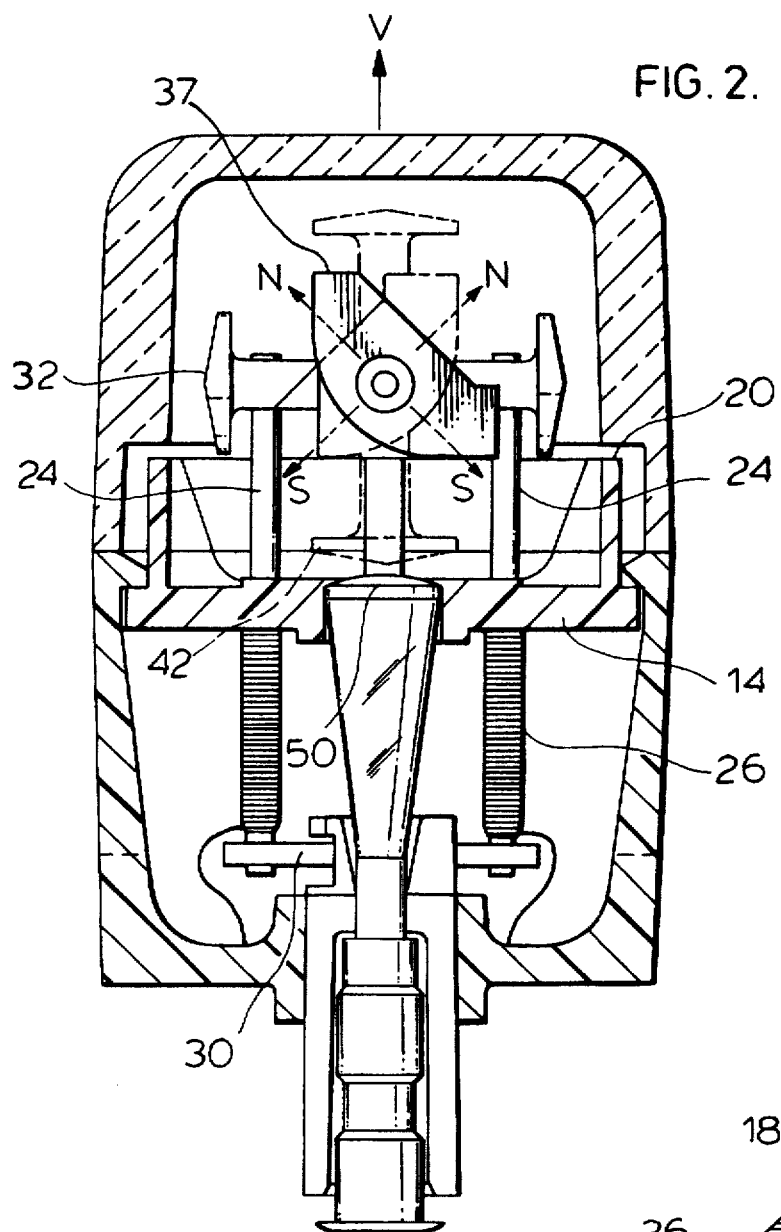
Figure 3:
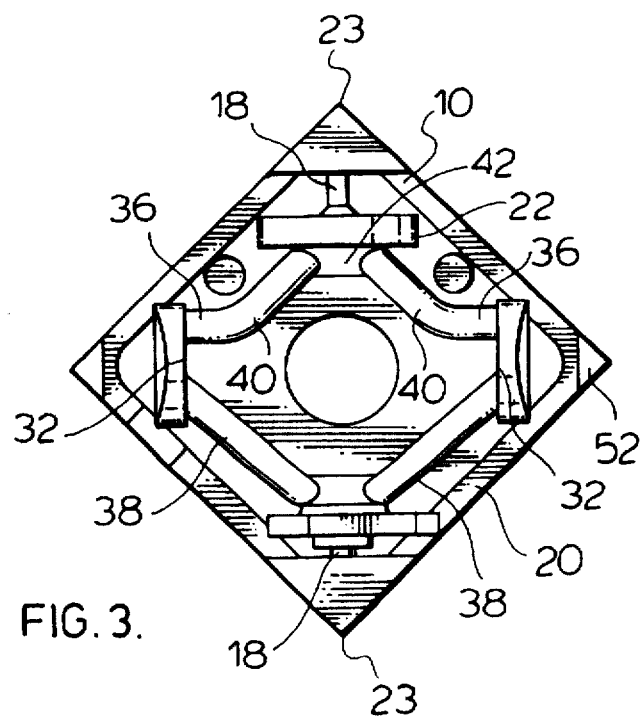
Figure 4:
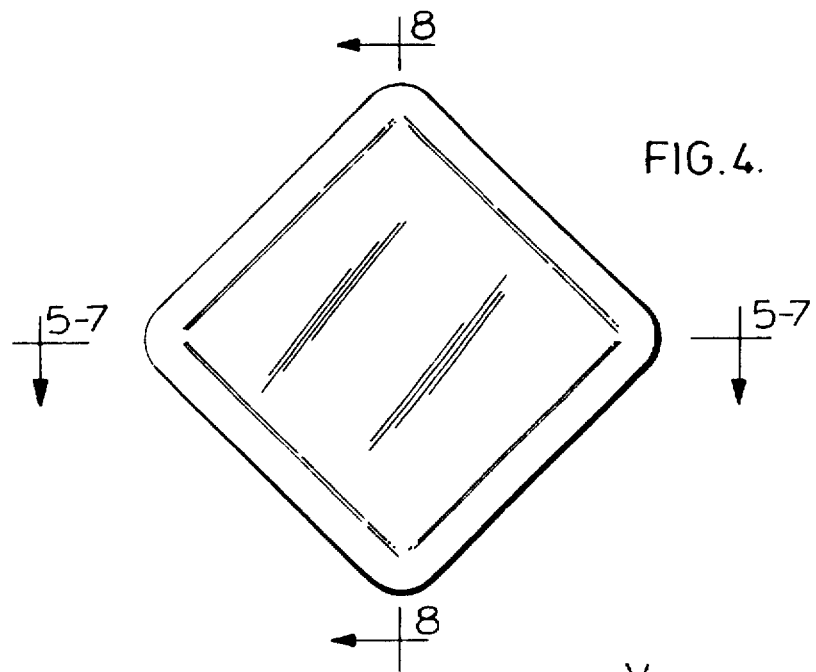
Figure 5:
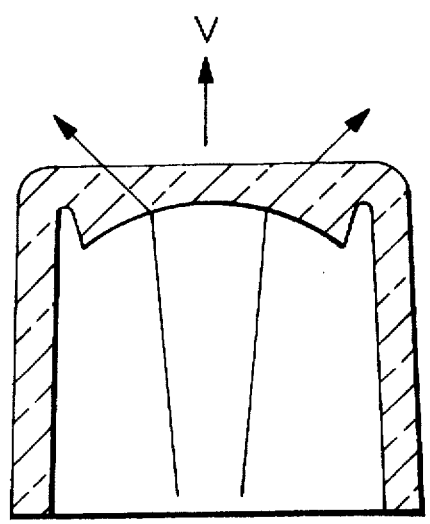
Figure 6:
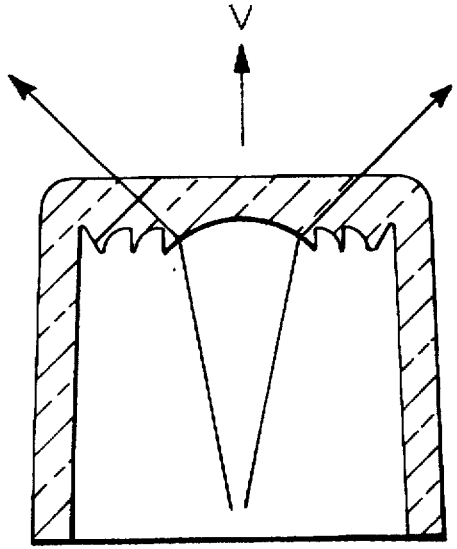
Figure 8:
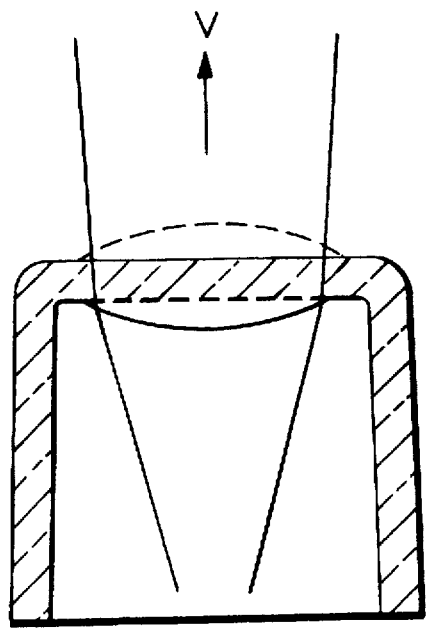
Figure 7:
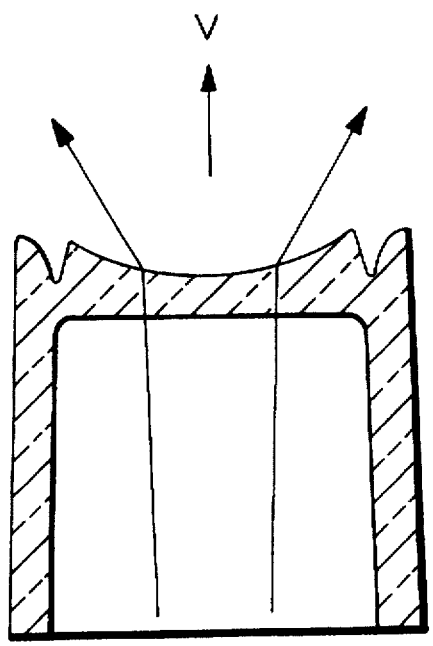

In drawings which illustrate preferred embodiments of the invention:

FIG. 1 is an exploded view of an assembly in accord with the invention,

FIG. 2 is a section perpendicular to the rotor axis of the assembled elements of FIG. 1, FIG. 3 is a view, in the viewing direction, of a preferred rotor and stator in accord with the invention, FIG. 4 is a view, in the viewing direction, of the cover, FIGS. 5–7 are a sections taken along lines 5.7—5.7 of FIG. 4 showing one cylindrical lens shape, FIG. 8 is taken along lines 8—8 of FIG. 4 showing three other types of cylindrical lens shape.

Figure 9:
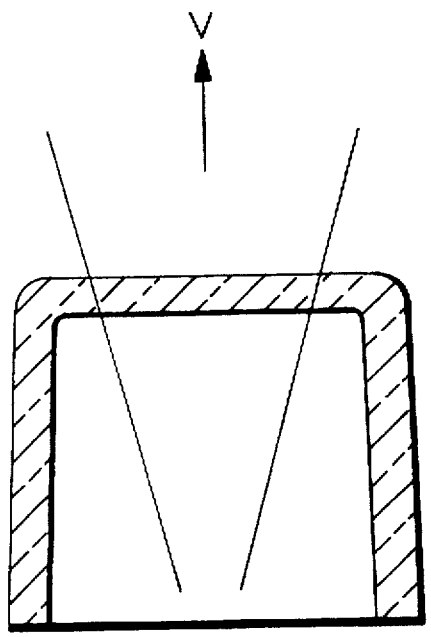

FIG. 9 is a section showing a parallel sided cover.

In the drawings the stator 10 is preferably square when viewed in the viewing direction V, with side walls 12 and a bottom 14. Walls 12 meet at corner edges 23. Diagonally opposed posts 16 pivotally mount a rotor typically by rotor spindles 18 (only one is shown) rotating in bores in posts 16. The stator side walls 12 end in wall edges 20.

The rotor has a permanent magnet 22 near one axial end defining a magnetic axis perpendicular to the pivot axis. The stator defines two hard magnetic drive cores 24 located on opposite sides of the pivot axis and near the pivot axis and adapted in accord with their reversible opposed polarities to drive the rotor between ON and OFF stop positions separated by 90°.

The drive cores project through the bottom of the stator and wound on each below the bottom is a winding 26. A soft iron link 30 connects the drive cores 24. Posts 28 extend rearwardly from locations on the bottom of the housing each near a different drive core 24. An electric conductor from a pulse source not shown is connected about one post 28 to the winding on one core, to the winding or the other core and then to the other post 28. The magnet and the sense of the core windings are arranged so that a pulse in one sense will turn the rotor from an ON to an OFF position (where the rays from a fibre bundle are blocked) and a pulse in the other sense will turn the rotor from an OFF position to an ON position where the light from fibre bundle may pass in the viewing direction. Due to the hard magnetism of the cores 24, they will maintain their polarity between pulses and hence hold the rotor in the orientation determined by the last pulse.

At the other end of the stator from magnet 22 a stop member rotatable with the rotor contacts a stator wall edge at each end of the 90° rotation to provide stops, that is rotational limits, at the OFF and ON positions. The stop member 37 may be molded integrally with the remainder of the rotor (other than the magnet. This fact, coupled with the use of the wall edges 20 for stops provides an efficient, inexpensive and compact assembly.

The magnetic arrangement and operation of the rotor are more fully described in my U.S. Pat. No. 5,337,077 which is incorporated herein by reference.

Between the magnet and the stop member a pair of arms 36 and 38 extend approximately radially from a central spaced position to junctions 32 at each end. The central spacing is chosen to let the maximum light from a fibre bundle betweeen them. One arm 36 must extend from the junction with a concave outward bend 40 to the spaced (and preferably parallel) central portion 38. The concave outward bend is required to avoid interference with the cores. However, the other arm 38 may extend relatively straight from the junction to the central portion 42.

At one junction a shutter panel 32 is dimensioned to overlie the fibre end in the OFF position to block the passage of rays in the viewing direction. The other junction member 32 is preferably similarly shaped to provide symmetry for the rotor.

The shutter arms are made sufficiently resiliently to allow them to be pressed toward each other sufficiently to insert pins 18 in their wells.

The fibre bundle 44 is mounted in a ferrule 46 and projects into holder 48. The holder 48 typically includes a lens 50 for focussing the rays from the fibre bundle end. Although the focussing cannot be exact due to differences in the direction of rays emitted from each optic fibre, there is produced in sum a cone of rays about the viewing direction V. The cone is usually but not necessarily circular in section. If the cone were bent at the cover lens to be described, as opposed to being expanded in one direction or compressed in another then it would be necessary to refer to first and second viewing directions inside and outside the cover lens. However this will seldom arise because it is found easier to tilt the stator to obtain the desired viewing angle than to bend the beam at the cover panel.

The stator as described has side walls defining four corner edges 23 parallel to the viewing direction. Diagonally opposed edges 23A are cut away from an intermediate location to the forward wall edge to provide forwardly facing shoulders 52. The other set of diagonally opposed edges 23B (corresponding to the location of posts 16) are cut away from an intermediate location to the rearward wall edge to provide rearwardly facing shoulders 25.

The base (which is not described in detail) provides a bottom aperture to receive the fibre optic bundle and lens 50 and aperture to allow rearward projection of the posts 28 carrying the wire therein. Side walls are cut rearwardly from the forward edge to provide flexible forwardly facing fingers 54 having inwardly directed ends defining rearwardly facing shoulders which cooperate with forwardly facing shoulders 52 to attach the base to the stator. The stator may alternatively or in addition be glued in the base.

Fingers 56 projecting rearwardly from the casing are provided for mounting the base on a mounting board (not shown).

The cover comprises a front panel 58 and side walls 60. The panel is of course transparent hence the side walls will normally be so also since the cover will normally be molded as a unit. Forwardly extending cuts from the rear of the side wall define resilient fingers 62 which extend inwardly to define forwardly facing shoulders (not shown) which grasp shoulders 25 and removably attach the cover to the stator.

It is noted that it is found that a more compact arrangement can be obtained where both base and cover are attached to the stator as shown than if the base and cover are attached to each other.

The cover panel may be planar as shown in FIG. 9 to allow passage of the rays without deflection.

In describing ray direction the relative directions entering and leaving the panels are discussed. However the small deflections at a planar air-panel interface are ignored.

The orientation of FIG. 4 is intended to represent the commonest orientation of the element on a board. FIG. 5 is a section at the horizontal diagonal of the panel showing a cylindrical concavo-planar lens causing increasing divergence of the beam in horizontal directions to cover more viewing locations in a parking lot or multilane highway. FIG. 6 shows a cylindrical concavo planar lens of the fresnel type with the same purpose and orientation. FIG. 7 show a plano-concave lens for the same purpose and orientation. The lens in FIG. 7 could be cylindrical piano concave but of the fresnel type.

FIG. 8 shows cylindrical lenses viewed in section along the vertical diagonal 8—8. A convexo planar lens is shown in solid lines and a piano convex lens are show in dotted lines.

Either lens will reduce the divergence of the beam in the vertical dimension when the spread of viewing directions is correspondingly reduced. This provides economical use of the available light from the optic fibre bundle.

A lens my have a vertical cylinder increasing divergence in width and a horizontal cylinder decreasing divergence in the height of the beam. The modifying effect may be reversed by rotating the panel 90°.

An increasing and decreasing divergence may be respectively provided by a concavo-concave and a convexo-convex lenses.

For other purposes spherical lenses to increase or decrease the divergence uniformly about the viewing direction may be used or combined with a cylindrical lens.

I claim:

1. Means including a stator for mounting an optic fibre, adapted to emit visible light about a selected viewing direction, means on the end of the optic fibre for producing a cone of light, a shutter rotatable about pivotal axis transverse to the viewing direction between ON and OFF orientation, where in ON position said cone is transmitted in the viewing direction and in OFF position the cone is blocked by an opaque shutter panel located between said axis and said fibre optic end, a transparent panel outward of said shutter located to transmit light in said cone, characterized by the fact that said shutter comprises an arm extending generally radially from the pivotal axis to adjacent the radially outward end, said arm shaped to allow the cone therepast in the ON position, said arm mounting said panel adjacent said radially outward end.

2. Means as claimed in claim 1 wherein there are two of said arms extending radially from the pivotal arm and defining between them an aperture to allow said cone therebetween.

3. Means as claimed in claim 1 wherein said panel is substantially parallel sided.

4. Means as claimed in claim 1 wherein said panel provides a lens to modify ray direction in such cone.

5. Means as claimed in claim 4 wherein said lens is cylindrical about an axis generally transverse to the viewing direction.

6. Means as claimed in claim 5 wherein said cylindrical lens is designed to increase the divergence of rays in directions perpendicular to the lens axis.

7. Means as claimed in claim 1 wherein said panel includes side walls for attachment to the stator.

8. Means as claimed in claim 2 wherein said panel is substantially parallel sided.

9. Means as claimed in claim 2 wherein said panel provides a lens to modify ray direction in such cone.

10. Means as claimed in claim 3 wherein said panel provides a lens to modify ray direction in said cone.

11. Means as claimed in claim 2 wherein said panel includes side walls for attachment to the stator.

12. Means as claimed in claim 3 wherein said panel includes side walls for attachment to the stator.

13. Means as claimed in claim 4 wherein said panel includes side walls for attachment to the stator.

14. Means as claimed in claim 5 wherein said panel includes side walls for attachment to the stator.

15. Means as claimed in claim 6 wherein said panel includes side walls for attachment to the stator.

* * * * *